United States Patent
Fuchigami et al.

(10) Patent No.: US 9,357,056 B2
(45) Date of Patent: May 31, 2016

(54) UNLOCKING A DEVICE THROUGH USER PERFORMED GESTURE

(75) Inventors: Takayoshi Fuchigami, Kanagawa (JP); Sunao Hashimoto, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 502 days.

(21) Appl. No.: 13/558,199

(22) Filed: Jul. 25, 2012

(65) Prior Publication Data

US 2013/0029731 A1    Jan. 31, 2013

(30) Foreign Application Priority Data

Jul. 25, 2011  (JP) ................................. 2011-161508

(51) Int. Cl.
  *H04W 88/02*  (2009.01)
  *H04M 1/725*  (2006.01)
  *G06F 3/0488* (2013.01)

(52) U.S. Cl.
  CPC ...... *H04M 1/72583* (2013.01); *H04M 1/72577* (2013.01); *G06F 3/04883* (2013.01)

(58) Field of Classification Search
  CPC ............... G06F 3/04883; H04M 1/172583; H04M 1/72577
  USPC .................................... 715/864, 863; 455/411
  See application file for complete search history.

(56) References Cited

U.S. PATENT DOCUMENTS

| | | | | |
|---|---|---|---|---|
| 5,821,933 A | * | 10/1998 | Keller et al. | 715/741 |
| 8,621,396 B1 | * | 12/2013 | Gossweiler, III | 715/863 |
| 2005/0003799 A1 | * | 1/2005 | Kang | 455/411 |
| 2008/0113327 A1 | * | 5/2008 | Larcheveque | 434/350 |
| 2009/0006991 A1 | * | 1/2009 | Lindberg et al. | 715/763 |
| 2010/0269040 A1 | * | 10/2010 | Lee | 715/702 |
| 2011/0181528 A1 | * | 7/2011 | Capela et al. | 345/173 |
| 2012/0131500 A1 | * | 5/2012 | Fujisawa | 715/800 |
| 2012/0229406 A1 | * | 9/2012 | Wu | 345/173 |

FOREIGN PATENT DOCUMENTS

| | | | | |
|---|---|---|---|---|
| JP | 2009-239477 A | | 10/2009 | |
| WO | WO 2011038601 | * | 4/2011 | G06F 21/32 |

OTHER PUBLICATIONS

Nagy, Breon (Breon's Samsung Fascinate Galaxy S [Verizon] written review; Posted Sep. 6, 2010, available at http://www.droiddog.com/android-blog/2010/09/breons-samsung-fascinate-galaxy-s-verizon-written-review/; captured by the Internet Archive on Sep. 9, 2010).*

* cited by examiner

*Primary Examiner* — Jennifer To
*Assistant Examiner* — John Repsher, III
(74) *Attorney, Agent, or Firm* — Studebaker & Brackett PC

(57) ABSTRACT

There are provided a portable device, and a control program and a control method of the portable device. The portable device includes a display unit, an input unit configured to detect an input to the display unit, and a control unit configured to set and cancel a limit function of limiting an input by the input unit. The control unit is configured to display two or more objects on the display unit and to cancel the limit function when two of the displayed objects are matched with each other.

19 Claims, 14 Drawing Sheets

UNLOCKING A DEVICE THROUGH USER PERFORMED GESTURE

CROSS-REFERENCE TO RELATED APPLICATION

This application claims priority from Japanese Patent Application No. 2011-161508, filed on Jul. 25, 2011, the entire subject matter of which is incorporated herein by reference.

BACKGROUND OF THE INVENTION

1. Field of the Invention

The present invention relates to a portable device, a control program and a control method of the portable device.

2. Description of the Related Art

A related-art portable device has a key lock function of invalidating an input to a key button and a touch panel. When the key lock function is set in the portable device, a user needs to cancel the key lock function in order to use the portable device.

In the portable device, the key lock function is canceled, for example, if a set key button is continuously pressed for a predetermined time period or longer (for example, refer to JP-A-2009-239477).

In this configuration, when the portable device is in a bag, it is possible that some object continuously presses the set key button by accident. In this case, the key lock function would be canceled despite the user's intention.

SUMMARY OF THE INVENTION

Accordingly, an aspect of the present invention provides a portable device capable of reducing a possibility of an input operation which a user does not intend, and a control program and a control method of the portable device.

According to an illustrative embodiment of the present invention, there is provided a portable device comprising: a display unit; an input unit configured to detect an input to the display unit; and a control unit configured to set and cancel a limit function of limiting an input by the input unit, wherein the control unit is configured to display two or more objects on the display unit and to cancel the limit function when two of the displayed objects are matched with each other.

According to another illustrative embodiment of the present invention, there is provided a portable device comprising: a display unit; an input unit configured to detect an input to the display unit; and a control unit configured to set and cancel a limit function of limiting an input by the input unit, wherein the control unit is configured to display two or more objects on the display unit and to cause any of a plurality of applications to be selectable when two of the displayed objects are matched with each other, and wherein when one of the applications is selected, the control unit is configured to cancel the limit function and execute the selected application.

According to a further illustrative embodiment of the present invention, there is provided a computer-readable storage medium having a control program stored thereon and readable by a controller of a portable device which includes a display unit and an input unit configured to detect an input to the display unit, the program, when executed by the controller, causing the controller to perform operations comprising: setting a limit function of limiting an input by the input unit; displaying two or more objects on the display unit; and canceling the limit function when two of the objects are matched with each other.

According to a further illustrative embodiment of the present invention, there is provided a control method of a portable device which includes a display unit and an input unit configured to detect an input to the display unit, the method comprising: setting a limit function of limiting an input by the input unit; displaying two or more objects on the display unit; and canceling the limit function when two of the objects are matched with each other.

According to the above configuration, it is possible to provide a portable device capable of reducing a possibility of an input operation which a user does not intend, and a control program and a control method of the portable device.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE INVENTION

Hereinafter, illustrative embodiments of the present invention will be described with reference to the drawings.

<First Illustrative Embodiment>

In the below, a mobile phone 10 which is an example of a portable device according to an illustrative embodiment of the present invention will be described with reference to the drawings.

Figure 1:
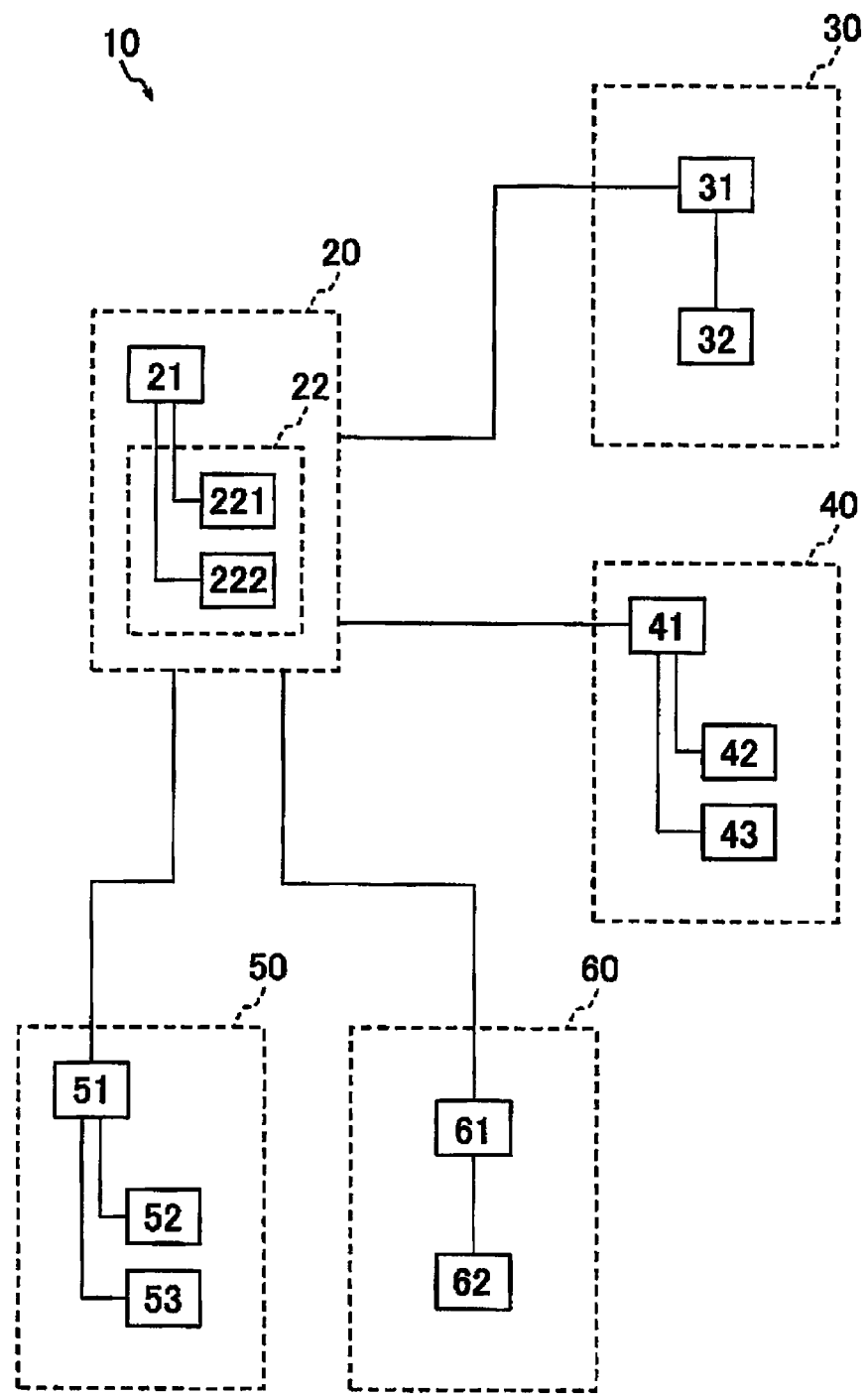
FIG. 1 is a block diagram showing a schematic configuration of a mobile phone according to a first illustrative embodiment of the present invention.

The mobile phone 10 shown in a block diagram of FIG. 1 has a control device 20, a display device 30, an input device 40, a voice device 50, a communication device 60 and a housing 70.

The control device 20 executes a program by using a hardware resource, thereby implementing various functions. The control device 20 has a calculation processing unit 21 and a storage 22. The calculation processing unit 21 and the storage 22 are electrically connected to each other.

The calculation processing unit 21 executes calculation processing of information about the entire control of the mobile phone 10. The calculation processing unit 21 is connected to the display device 30, the input device 40, the voice device 50 and the communication device 60.

The calculation processing unit 21 is connected with the storage 22. The storage 22 stores therein various information which is used for the control of the mobile phone 10. The storage 22 includes a first storage device 221 and a second storage device 222.

The first storage device 221 has a function of temporarily storing therein various information with which the calculation processing unit 21 performs the calculation processing. As the first storage device 221, a volatile memory and a non-volatile memory may be adopted. The first storage device 221 is selected by considering a storing speed of the input information, an output speed of the stored information, power which is consumed upon input and output of the information, and the like. The volatile memory may include a DRAM (Dynamic RAM), an SRAM (Static RAM) and the like, for example. The non-volatile memory may include a flash memory, a magnetic storage device, an MRAM (Magnetoresistive RAM), an ReRAM (Resistance RAM), an FeRAM (Ferroelectric RAM), a PRAM (Phase shift RAM) and the like. In this illustrative embodiment, the DRAM is adopted as the first storage device 221.

The second storage device 222 has a function of storing therein the information which is used for the control of the mobile phone 10, for a long time. As the second storage device 222, the non-volatile memory may be adopted. The second storage device 222 is selected by considering a storing speed of the input information, an output speed of the stored information, power which is consumed upon input and output of the information, a storage capacity which can be stored therein, and the like. In this illustrative embodiment, the flash memory is adopted as the second storage device 222. In the second storage device 222, data of contents such as letters, images, voices, sounds and video pictures of the mobile phone 10 may be recorded.

The control device 20 expands the program or data, which is stored in the second storage device 222, into the first storage device 221 and causes the calculation processing unit 21 to execute the calculation included based on the expanded program.

The display device 30 has a function of displaying information of the mobile phone 10. The display device 30 includes a display 31 and a display control unit 32. The display control unit 32 is electrically connected to the display 31 and the calculation processing unit 21 of the control device 20, respectively.

The display 31 is a device for displaying the information of the mobile phone 10. Information of the mobile phone 10 is displayed on a display area 310 of the display 31. The display 31 is electrically connected to the display control unit 32. As the display 31, a liquid crystal display (LCD), an electroluminescence display (ELD) and the like may be used. Regarding the ELD, any of an organic ELD and an inorganic ELD may be adopted. In this illustrative embodiment, the LCD is adopted as the display 31.

The display control unit 32 controls display information of the mobile phone 10. The display control unit 32 controls the display, based on the display information output from the calculation processing unit 21. The display control unit 32 converts the display information into a display signal for driving the display. That is, the display control unit 32 functions as a driving driver of the display 31. Also, the information which is displayed on the display area 310 of the display 31 is controlled by the display control unit 32.

The input device 40 inputs an operation signal to the mobile phone 10. The input device 40 includes a first input unit 41, a second input unit 42 and an input control unit 43. The input control unit 43 is electrically connected to the first input unit 41 and the second input unit 42, respectively. The input control unit 43 is electrically connected to the calculation processing unit 21.

The first input unit 41 detects a change when an object comes close to a surface thereof and a position of the change and uses those as an input signal. As the first input unit 41, various contact sensors such as electrostatic capacitance type, resistance film type, surface acoustic wave type (or ultrasonic wave type), infrared type, electromagnetic induction type and load detection type may be used. In this illustrative embodiment, an electrostatic capacitance type detection device is adopted as the first input unit 41. The first input unit 41 of the electrostatic capacitance type detects a change in the electrostatic capacitance between electrodes, which is caused as an object such as finger comes close thereto. The first input unit 41 of this illustrative embodiment is configured to detect that one or more fingers are touched. Also, the first input unit 41 is configured to continuously input a trajectory of touch when a touch part is moved with the finger being touched. The trajectory input is subject to the calculation processing in the calculation processing unit 21, so that it can be detected as an input of a direction, a figure and the like, for example. Also, when performing the calculation processing of the trajectory input, the calculation is performed to the input time, so that it can be detected as an input of a moving speed, a speed vector and the like, for example.

In this illustrative embodiment, the first input unit 41 has a detection unit which is light transmissive. The first input unit 41 is arranged to overlap over the display area 310 of the display 31. The first input unit 41 and the display 31 function as a touch panel. In the touch panel, it is possible to designate any position in the display area 310 of the display 31.

The second input unit 42 detects a user operation and uses it as an input signal. As the second input unit 42, various switches such as a push button switch, a toggle switch, a slide switch, a rotary switch, an electrostatic capacitance switch and the like may be used. Those various switches may be mixed. In this illustrative embodiment, the push button switch is adopted as the switch. Also, the second input unit 42 includes a call key 42a, a call ending key 42b and a menu key 42c.

The input control unit 43 controls the input signal to the mobile phone 10. The input signals transmitted from the first input unit 41 and the second input unit 42 are converted and thus become the input information by the input control unit 43. The input information is transmitted to the calculation processing unit 21 and is used for the control of the mobile phone 10. In this illustrative embodiment, the input control unit 43 includes an analog digital converter (A/D converter). When the input signals of the first input unit 41 and the second input unit 42 are detected as analog signals, they are converted into digital signals through the A/D converter, which are then treated as the input information.

The voice device 50 has a voice input unit 51, a voice output unit 52 and a voice control unit 53. The voice control unit 53 is electrically connected to the voice input unit 51 and the voice output unit 52, respectively. The voice control unit 53 is electrically connected to the calculation processing unit 21.

The voice input unit 51 has a function of inputting a voice signal to the mobile phone 10. The voice (sound wave) input to the voice input unit 51 is converted into an electric voice signal, which is then input to the mobile phone 10. The converted voice signal is transmitted to the voice control unit 53. As the voice input unit 51, various microphones may be adopted. As the microphone, various types such as a type of using electromagnetic induction, a type of using a change in electrostatic capacitance, a type of using a change in resistance value, a type of using a piezoelectric phenomenon, a type of detecting voice vibration by touch and the like may be adopted.

The voice output unit 52 has a function of outputting the voice signal, which is transmitted from the mobile phone 10, as a voice signal. The voice signal transmitted from the mobile phone 10 is converted into a vibrational wave through the voice output unit 52 and is then output as voice. The voice signal is transferred from the voice control unit 53 to the voice output unit 52. As the voice output unit 52, various speakers may be adopted. As the speaker, a type of converting the voice signal to vibration by using an electromagnetic force, a type of converting the voice signal to vibration by using an electrostatic force and the like may be adopted.

The voice control unit 53 controls the voice signal of the mobile phone 10. The voice signal input to the voice input unit 51 is converted into the voice information through the voice control unit 53. The converted voice information is transmitted to the calculation processing unit 21 and is used for the control of the mobile phone 10. Also, the voice information transmitted from the calculation processing unit 21 to the voice control unit 53 is converted into a voice signal, which is then output to the voice output unit. In this illustrative embodiment, the voice control unit 53 includes an analog/digital converter (A/D converter) and a digital/analog converter (D/A converter). When the voice signal is detected as an analog signal in the voice input unit 51, it is converted into a digital signal through the A/D converter, which is then treated as the voice information. Also, when the voice information output from the voice output unit 52 is transmitted as a digital signal, it is converted (decoded) into an analog signal through the D/A converter, which is then treated as the voice signal.

The communication device 60 has a function of enabling the mobile phone 10 to perform information communication. The communication device 60 establishes a wireless signal line with a base station through a channel allotted by the base station. The communication device 60 performs call communication and information communication with the other apparatus through the established wireless signal line with the base station. The communication device 60 includes an antenna 61 and a communication control unit 62. The antenna 61 and the communication control unit 62 are electrically connected to each other. The voice control unit 53 is electrically connected to the calculation processing unit 21. In this illustrative embodiment, the communication device 60 adopts the wireless communication. However, the communication device may adopt wired communication. The communication system of the wireless communication includes various systems such as CDMA (Code Division Multiple Access), FDMA (Frequency Division Multiple Access) and the like.

The antenna 61 has at least one of a function of outputting the information transmitted from the mobile phone 10 and a function of inputting the information received by the mobile phone 10. Meanwhile, in this illustrative embodiment, one antenna 61 is adopted. However, a plurality of antennas may be adopted. When a plurality of antennas are adopted, the different antennas may be used for transmission and reception, the different antennas may be used depending on types of the information and the plurality of antennas may be switched so that a transfer speed of the information becomes optimal.

The communication control unit 62 controls the communication information between the mobile phone 10 and the other device. The communication control unit 62 is connected to the communication device 60.

Figure 2:
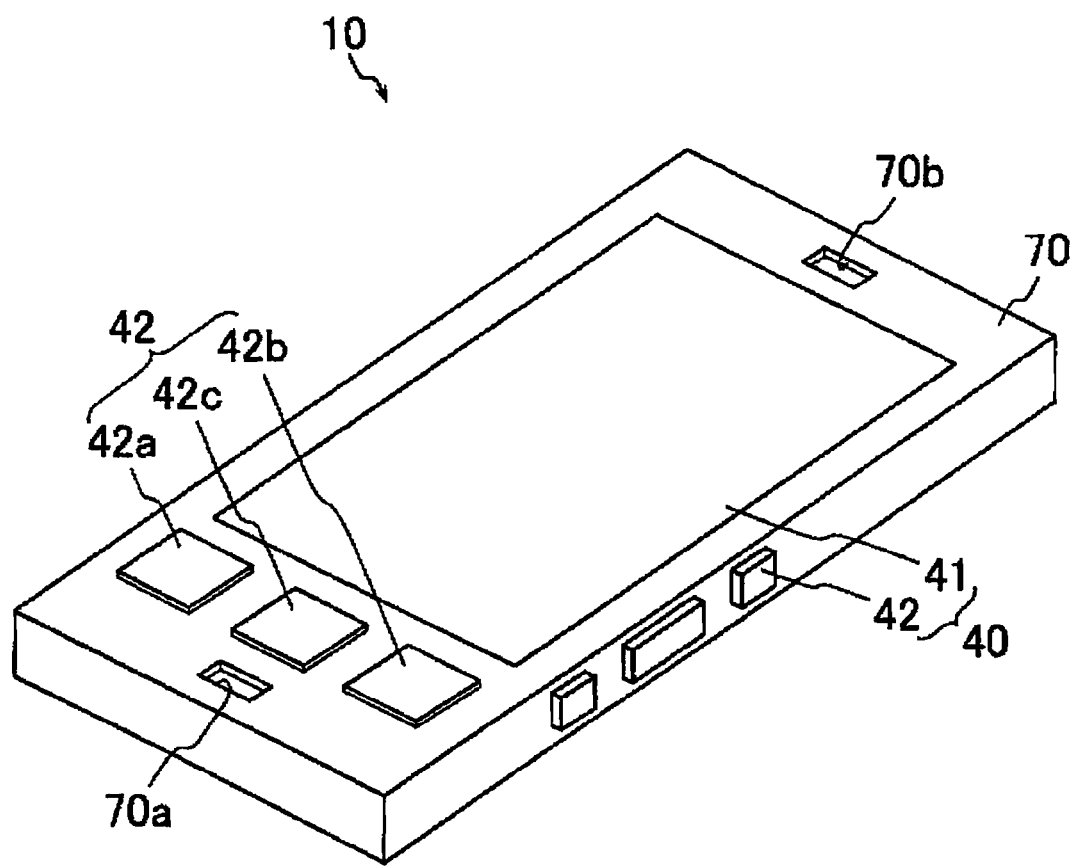
FIG. 2 is an overall perspective view showing a configuration of the mobile phone shown in FIG. 1.

The housing 70 which is shown in FIG. 2 functions as a support base member of the mobile phone 10. That is, the housing 70 supports the display device 30, the control device 20, the input device 40, the voice devoice 50 and the communication device 60. The housing 70 has a rectangular parallelepiped shape and has a pair of opposite surfaces which are larger than the other surfaces. Here, the surfaces having a larger area than the other surfaces are main surfaces. The first input unit 41 is arranged on one main surface of the housing 70. In the mobile phone 10, the display area 310 of the display 31 is transmissively displayed through the first input unit 41. As described above, the first input unit 41 and the display 31 function as the touch panel. Also, the main surface of the housing 70 is provided with a first through-hole 70*a* and a second through-hole 70*b*. The voice which is input to the voice input unit 51 is input through the first through-hole 70*a* and the voice which is output from the voice output unit 52 is output through the second through-hole 70*b*. The first through-hole 70*a* and the second through-hole 70*b* are provided at both end portions of the housing 70 having a rectangular parallelepiped shape in a longitudinal direction.

In this illustrative embodiment, the mobile phone 10 adopts the configuration as described above. In the below, operations of the mobile phone 10 are specifically described.

The mobile phone 10 can execute various application softwares (hereinafter, referred to as 'application (App)') including call, e-mail and WEB browser functions. The applications can be executed by selecting icons displayed on the display area 310 of the display 31. The applications are controlled by the control device 20. The control device can control the various devices such as the display device 230, the input device 40, the voice device 50 and the communication device 60, based on the application programs.

Figure 3:
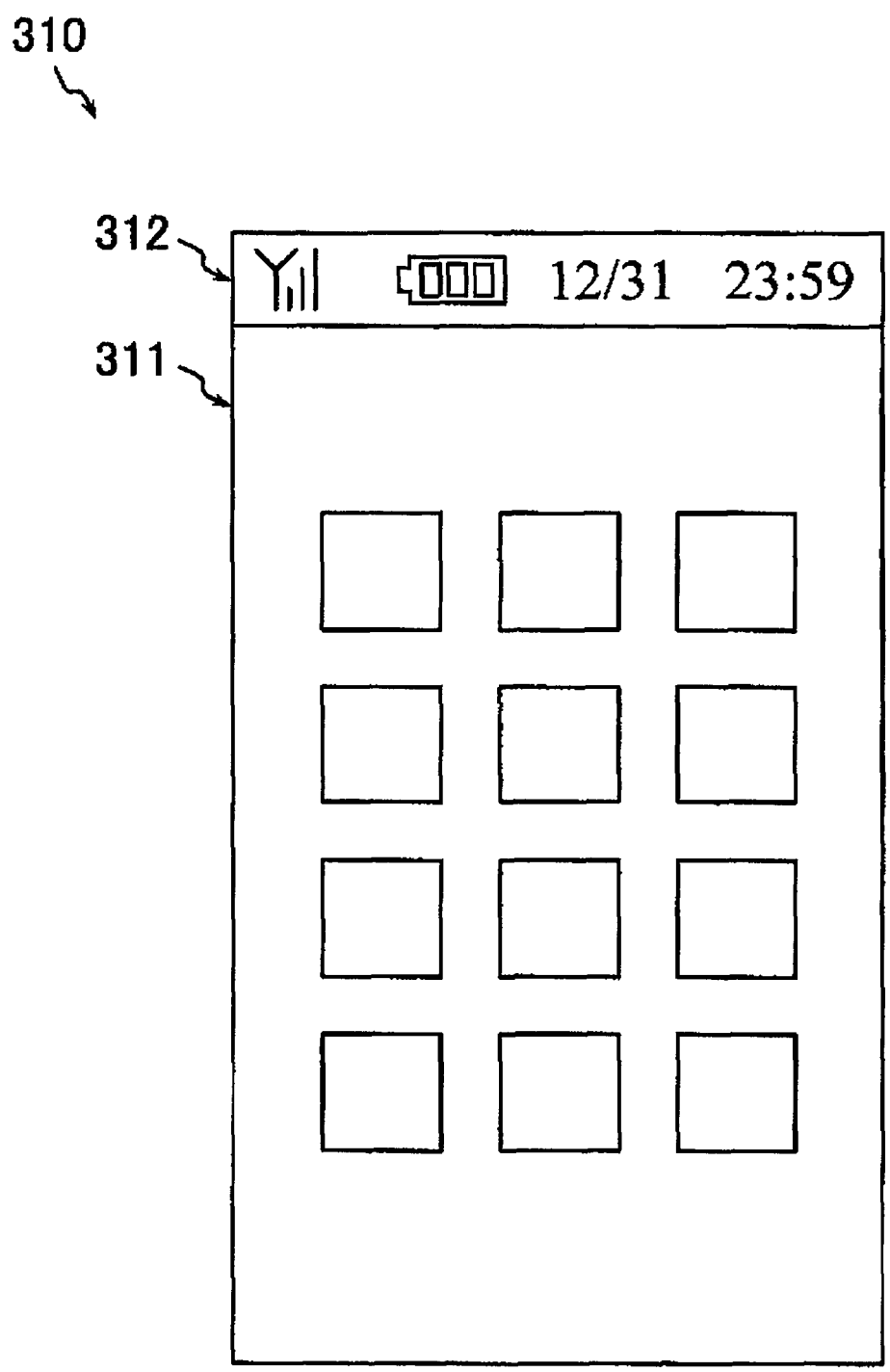
FIG. 3 shows a standby screen of the mobile phone shown in FIG. 1.

The display of the display area 310 may include a standby screen shown in FIG. 3, for example. The standby screen is a display indicating that the applications to be processed on a foreground stand by for selection. In the meantime, when displaying the standby screen, the mobile phone 10 may execute various applications on a background and may execute accessory software displayed on the standby screen.

In the standby screen, the display area 310 is divided into a first display area 311 and a second display area 312. In the first display area 311, icons of various applications are arranged. When an icon of an arranged application is selected, the application starts on the foreground and corresponding various processing is executed by the control device 20. In a background of icon, a predetermined background image can be displayed. In the second display area 312, various notification information is displayed. The notification information may include various statuses of the mobile phone 10, emergency information such as disaster and the like. The status information of the mobile phone 10 may include a remaining battery level of the mobile phone 10, an application which is being executed in the mobile phone 10, event information occurring in the mobile phone 10, an electric wave receiving state which is being received by the antenna 61, a type of a communication line which is used by the mobile phone 10, a setting state of the mobile phone 10, a date, time set in the mobile phone 10, and the like. The status of the mobile phone 10 may be displayed by an icon or pictogram.

The mobile phone 10 has a limit function of limiting at least one of a part of the various functions including the applications and a part of the inputs by the input device 40. In the mobile phone 10 of this illustrative embodiment, when the limit function is set, the starting of a new application by a user operation is limited and an input by the first input unit 41 is limited, for example. The method of limiting the input by the first input unit 41 may include a method of stopping a driving of the device configuring the first input unit 41, a method of interrupting an input signal which is output from the first input unit 41, a method of not processing an input signal which is output from the first input unit 41, and the like. In this illustrative embodiment, the method of stopping a driving of the device configuring the first input unit 41 is adopted. Also, the input of the first input unit 41 is limited and the display of the display 31 is canceled.

Figure 4:
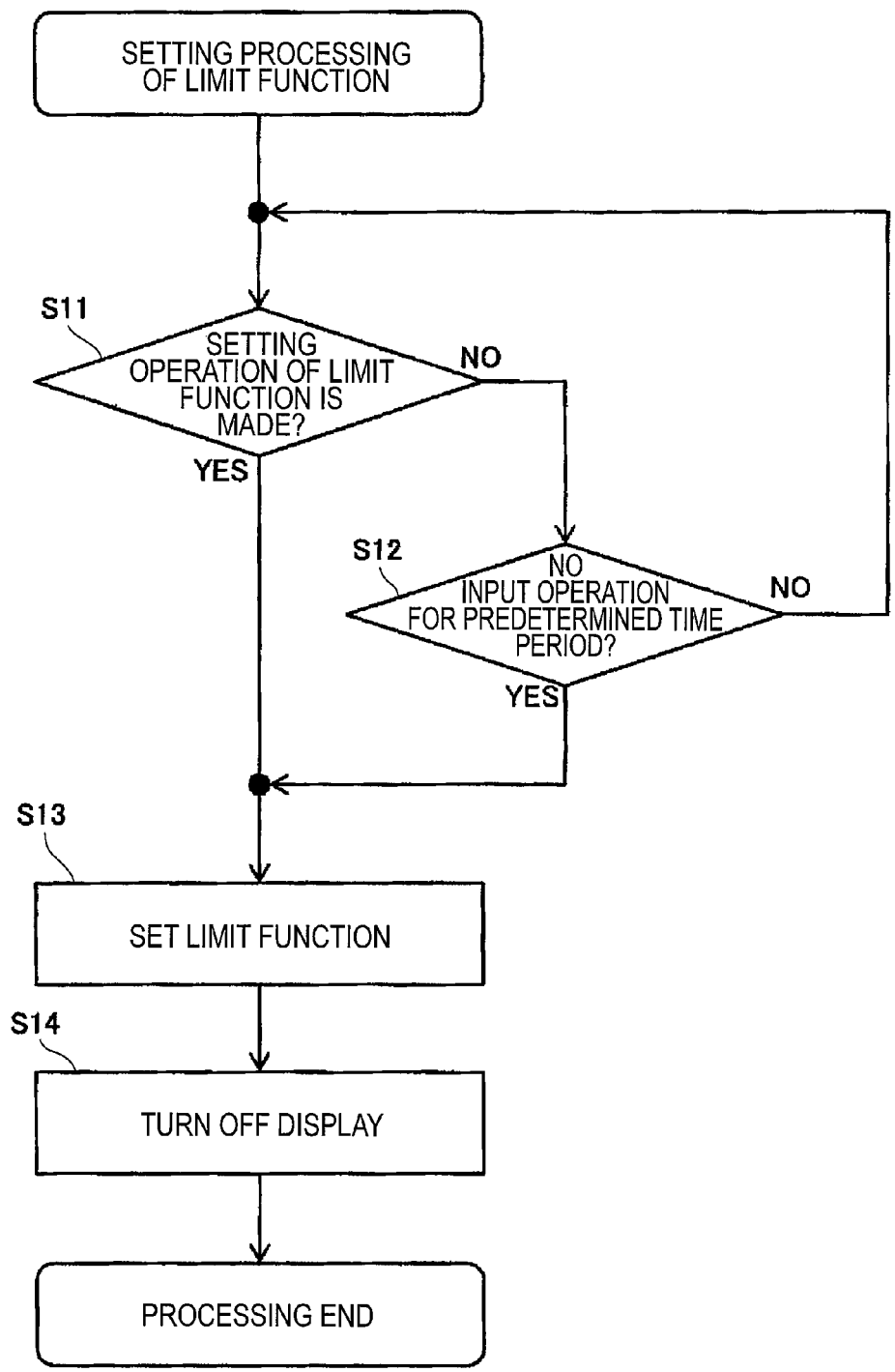
FIG. 4 is a flowchart showing a setting sequence of a limit function of the mobile phone shown in FIG. 1.

The setting of the limit function is processed by the control device 20 in accordance with a flowchart shown in FIG. 4. In the flowchart, a comparison determination is performed by the control device 20 based on an output from the input device 40. First, in a first step S11, it is determined whether an input operation of requesting a setting of the limit function is performed. In the first step S11, when it is determined that an input operation of requesting a setting of the limit function is performed, the process proceeds to a second step S12. Otherwise, the process proceeds to a third step S13. In the second step S12, it is determined whether an input operation is performed for a predetermined time period. In the second step S12, when it is determined that the input operation is performed for a predetermined time period, the process proceeds to the third step S13. Otherwise, the process returns to the first step S11. As the setting operation of the limit function, various operations may be adopted. For example, in this illustrative embodiment, when the call ending key 42b is operated while displaying the standby screen, the operation is considered as the setting operation of the limit function. In the third step S13, the setting processing of the limit function is performed and process proceeds to a fourth step S14. In the fourth step S14, the display on the display 41 is turned off and the setting processing of the limit function ends. When the setting processing of the limit function is performed, an input operation to be received is limited until the setting of the limit function is canceled. While the limit function is set, it is possible to reduce the possibility that an unintended input operation is performed. In this illustrative embodiment, the control device 20 stops the supplying of the driving power to the first input unit 41, thereby limiting an input.

In this illustrative embodiment, the setting of the limit function can be canceled by a subsequent input operation. First, a first cancel processing of displaying a cancel screen on the display 31 which has been turned off and canceling the input limit by the first input unit 41 is performed. For example, in this illustrative embodiment, the menu key 42c is operated, thereby the first cancel processing is performed. An alternatively adoptable operation method of the first cancel processing may include a method of operating the second input unit 42, a method of waiting for an elapse of predetermined time while keeping an operation of the second input unit 42, and the like. As the cancel screen, a display shown in FIGS. 5A and 5B may be exemplified. In the cancel screen shown in FIGS. 5A and 5B, a first circular object ob1 shown with a solid line is matched with a second circular object ob2 shown with a dotted line, thereby second cancel processing is performed. By performing the second cancel processing, the display on the display 31 is switched from the cancel screen into the standby screen.

Here, an operation method of the touch panel configured by the display 31 and the first input unit 41 is described. The operation method of the touch panel is described first, and then, the operation method of the cancel screen shown in FIGS. 5A and 5B is specifically described.

In this illustrative embodiment, an operation which a user touches a display surface of the touch panel by a touch member is referred to as 'touch.' In the meantime, an operation of separating the touch member from the touch panel is referred to as 'touch is released' or 'release.' The coordinates indicated by the touch are referred to as 'touch point' and the coordinates indicated by the release are referred to as 'release point.' An operation of moving the touch member with the touch member being touched on the display surface of the touch panel is referred to as 'slide' or 'slide touch operation.' Also, an operation which the user touches the surface of the touch panel and then releases is referred to as 'tap' or 'touch and release.' An operation which the user performs for the touch panel, such as touch, release, slide and tap, is collectively referred to as 'touch operation.' Regarding the touch operation, the control device 20 determines which operation is performed based on the output from the input device 40. Here, the 'touch member' may include a user's finger, various objects such as touch pen having a conductor attached to a tip end thereof, and the like. An object which can be adopted as the touch member is appropriately selected depending on the detection method which is adopted by the first input unit 41.

Figure 5A:
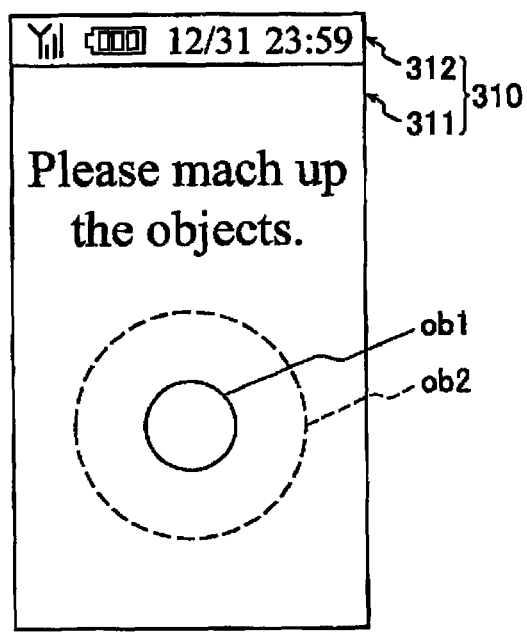
FIGS. 5A and 5B show a cancel screen of the mobile phone shown in FIG. 1.
Figure 5B:
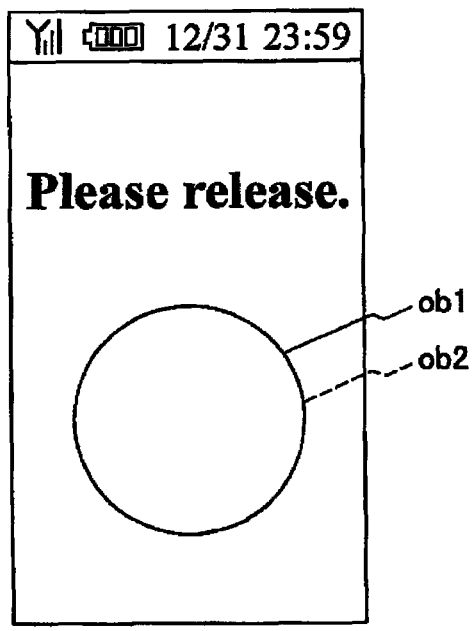
Figure 6:
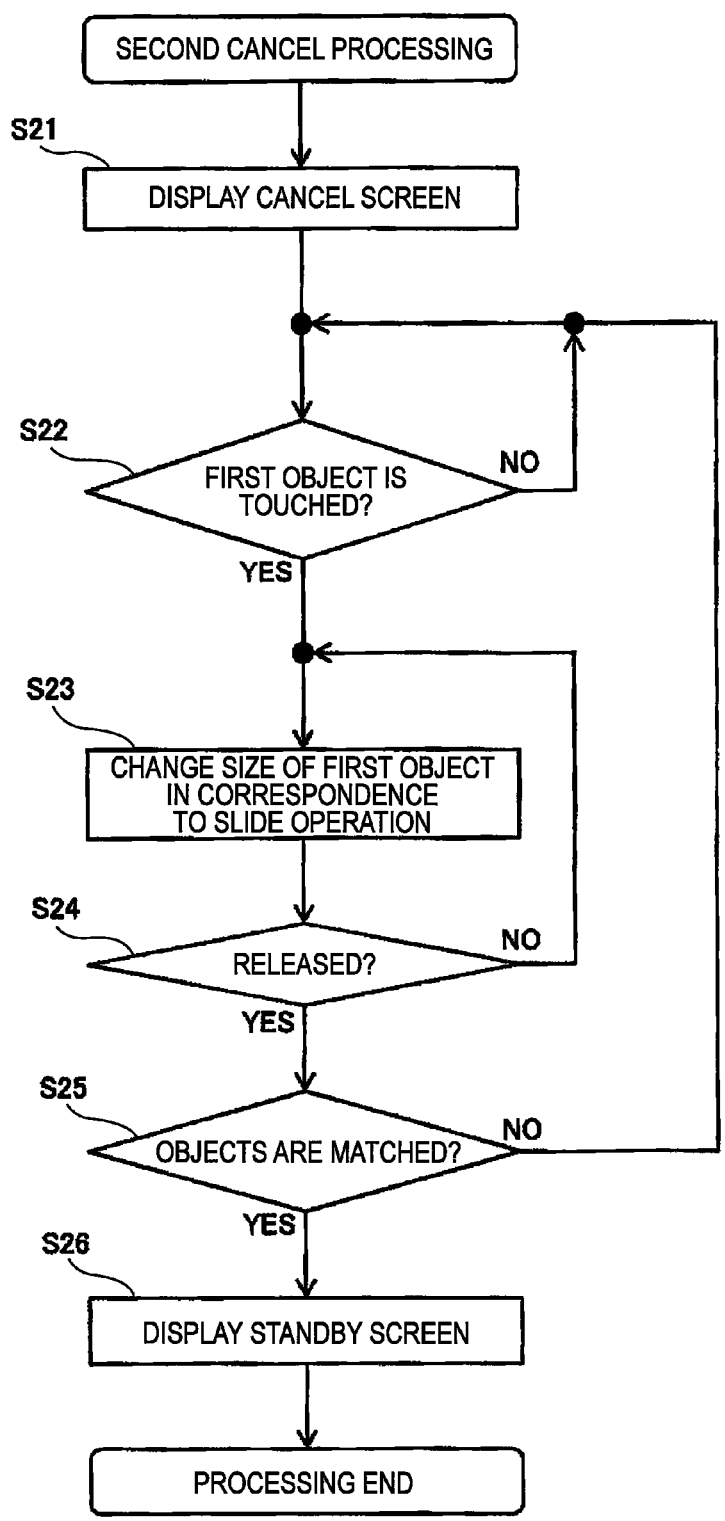
FIG. 6 is a flowchart showing an operation sequence of the cancel screen shown in FIG. 5.

The cancel screen shown in FIGS. 5A and 5B is processed by the control device 20, in accordance with a flowchart shown in FIG. 6. In the flowchart, a comparison determination is performed by the control device 20 based on an output from the input device 40.

First, in a first step S21, the cancel screen is displayed. Then, in a second step S22, it is determined whether the first object ob1 is touched. When it is determined that the first object ob1 is touched, the process proceeds to a third step S23. When it is determined that the first object ob1 is not touched, the control device again executes the second step S22. Whether the first object ob1 is touched is determined based on whether a touch point is on the first object ob1. Then, in the third step S23, the control device changes a size of the first object ob1, in correspondence to a sliding distance of the finger having touched on the first object ob1. In the third step S23, when the coordinates at which the finger having slid touches are located outside the first object ob1, the first object ob1 is enlarged. The first object ob1 is enlarged about a center of the first object ob1 while keeping a circular shape. A radius of the enlarged first object ob1 is a distance between the center and the coordinates being touched. The change of the size of the first object ob1 is repeated until it is determined in a fourth step S24 that the touch is released. In the fourth step S24, when it is determined that the touch is released, the process proceeds to a fifth step S25. In the fifth step S25, it is determined whether the first object ob1 is matched with the second object ob2 when the touch is released. When it is determined in the fifth step S25 that the two objects ob1, ob2 are matched with each other, the process proceeds to a sixth step S26. When it is determined that they are not matched, the process returns to the second step S22. In the sixth step S26, the standby screen is displayed as the second cancel processing and then the second cancel processing is over. Therefore, the second cancel processing is performed by the release operation with the two objects being matched with each other.

Thus, it is possible to reduce the unintended cancel of the limit function. In this illustrative embodiment, when it is determined that the release is performed with the two objects being matched with each other, the control device 20 starts the power supply to the first input unit 41 and thus cancels the limit function.

In the flowchart of the cancel screen, it is determined in the fourth step S24 and the fifth step S25 whether the objects are matched when the touch is released. Here, in order to obtain the determination that the objects are matched, it is necessary to appropriately change the size of the first object ob1 by the slide operation. First, in the third step S23, the finger which has touched the first object ob1 in the second step S22 is slid toward the dotted line indicating the second object ob2. Then, the finger is slid onto the dotted line indicating the second object ob2, so that the first object ob1 and the second object ob2 are made to be matched with each other. Then, the touch is released with the first object ob1 and the second object ob2 being matched with each other, so that it can be determined in the fourth step S24 and the fifth step S25 that the two objects are matched with each other. That is, the touch is performed such that the touch point is located on the first object ob1 and the slide operation is performed such that the release point is located on the second object ob2, thereby the second cancel processing is performed.

Also, in the cancel screen, when the touch is released at a state where the first object ob1 and the second object ob2 are not matched with each other, the second cancel processing is not performed and the screen is returned to the initial display of the cancel screen. This situation occurs when the touch is released at a state where the moving distance during the slide operation after the touch on the first object ob1 is shorter and the first object ob1 is displayed smaller, compared to the second object ob2. Also, this situation occurs when the touch is released at a state where the moving distance during the slide operation after the touch on the first object ob1 is longer and the first object ob1 is displayed larger, compared to the second object ob2. That is, the moving distance during the slide operation is set as the processing condition of the second cancel processing. With this processing condition of the second cancel processing, even when an unintentionally touched object is moved with being touched, it is possible to reduce the possibility that the release processing is unintentionally performed.

Also, in the display configuration shown in FIGS. 5A and 5B, when the first object ob1 and the second object ob2 are matched with each other, a message prompting a user to release the touch is displayed on the display 31. That is, it is shown that the second cancel processing is performed by the release operation. Hence, it is possible to confirm that the release processing is performed in accordance with the user's intention. Also, when displaying a new message, instead of the message previously displayed, it may be possible to display the new message differently from the message previously displayed. For example, the letters configuring the message may be enlarged or may be displayed on and off or colors thereof may be changed such that the user can easily recognize the changed message. In the display configuration shown in FIGS. 5A and 5B, the letters configuring the message are enlarged and displayed.

Also, in the third step S23, the size of the first object ob1 is changed by the slide operation of the user. By the change in size, it is possible to confirm that the touch operation for canceling the limit function is recognized.

In the determination of determining whether the first object ob1 and the second object ob2 are matched with each other in the fifth step S25, it may be regarded that the two objects ob1, ob2 are matched when they are within a predetermined range. By setting a range within which it is regarded that the two objects ob1, ob2 are matched, even though the size of the first object ob1 is changed upon the release operation, for example, it is possible to perform the second cancel processing by the user's intention. Also, since it is possible to easily match the two objects each other, it is possible to reduce the user's burden on the operation.

Figure 7:
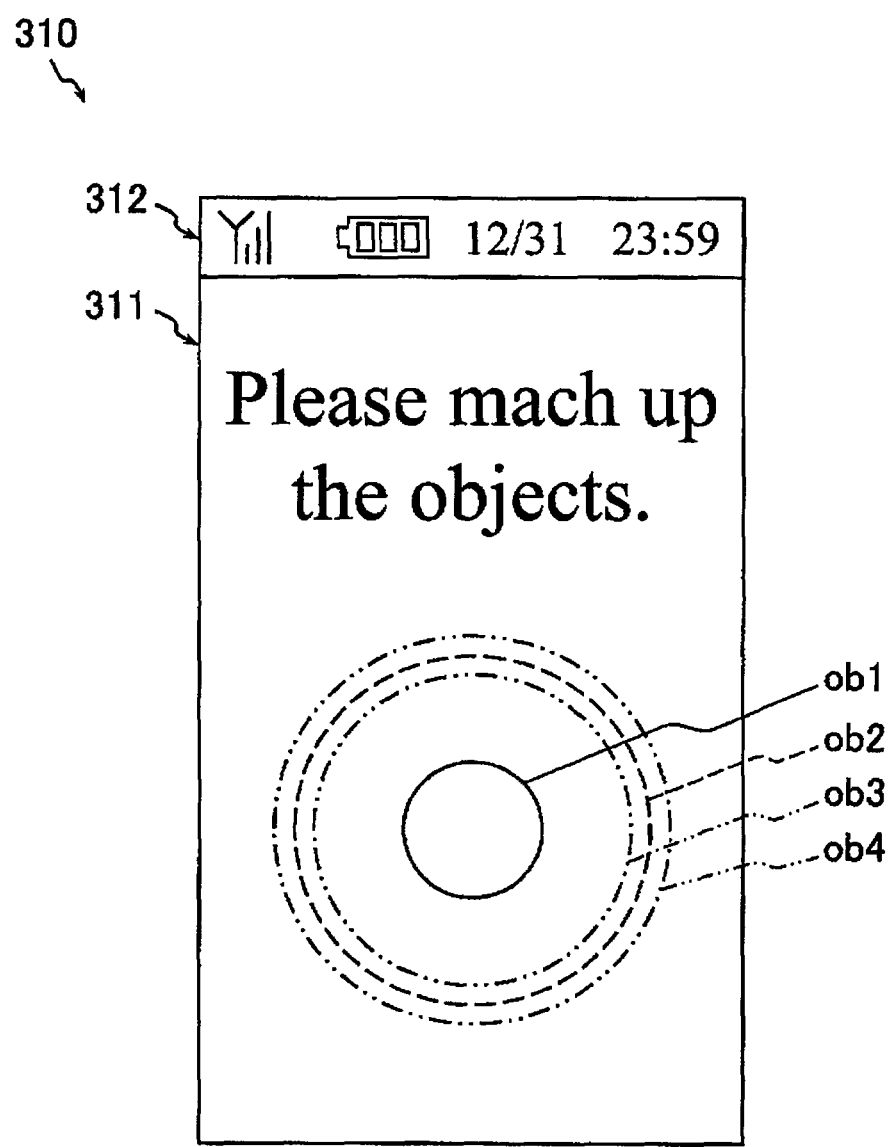
FIG. 7 shows a modified illustrative embodiment of the cancel screen shown in FIG. 5.
Figure 8:
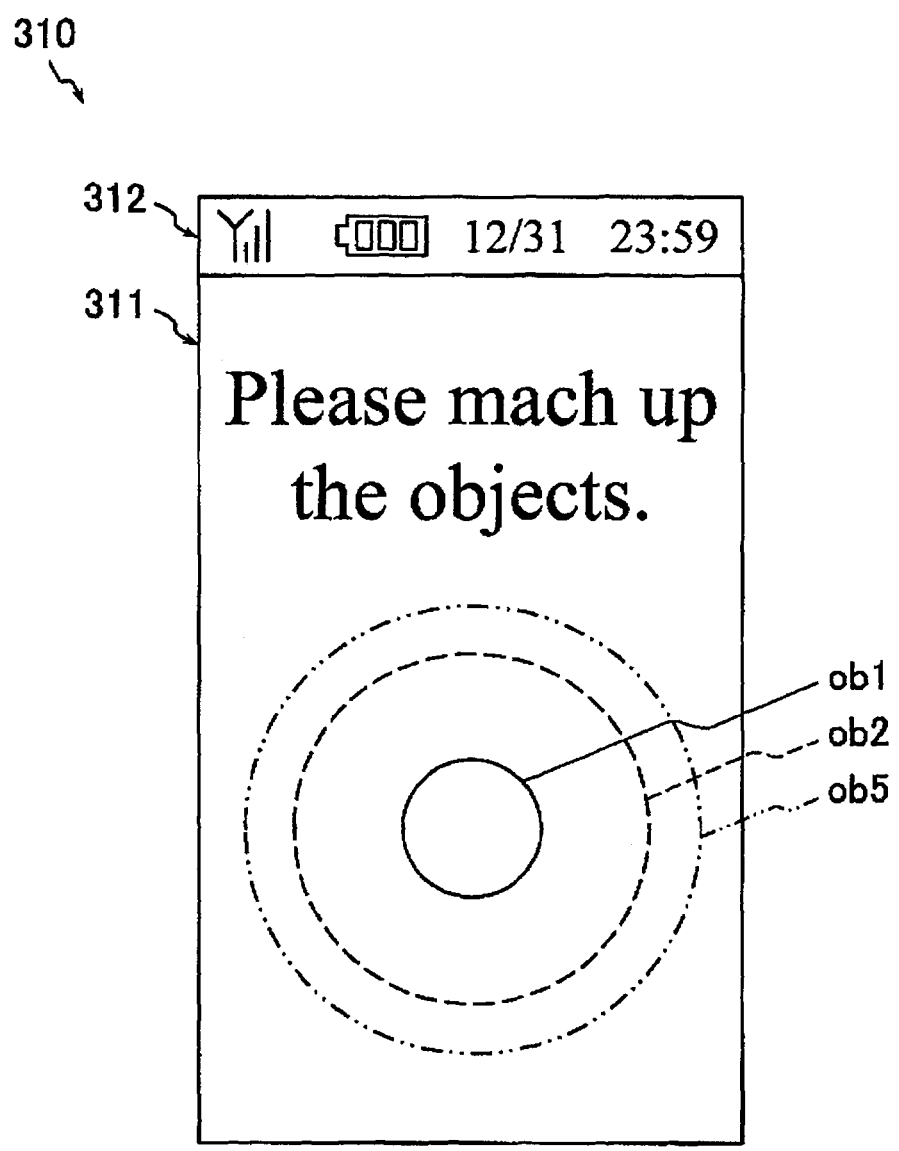
FIG. 8 shows a modified illustrative embodiment of the cancel screen shown in FIG. 5.

Regarding the processing method of the cancel processing adopting the range within which it is regarded that the two objects ob1, ob2 are matched, two modified examples are shown in FIGS. 7 and 8.

In a first example shown in FIG. 7, after the first object ob1 is matched with the second object ob2, the release processing is performed while permitting an error of a predetermined range. In the first example, when a size of the first object ob1 is larger than a third object ob3 and smaller than a fourth object ob4 at the time when the touch is released after the two objects ob1, ob2 are matched with each other, it is regarded that the two objects ob1, ob2 are matched.

In a second example shown in FIG. 8, when a size of the first object ob1 is larger than the second object ob2 and smaller than a fifth object ob5 at the time when the touch is released, it is regarded that the two objects ob1, ob2 are matched.

In the processing method of the cancel processing adopting the range within which it is regarded that the two objects ob1, ob2 are matched, the change in size on the display screen of the first object ob1 may be interrupted after the two objects ob1, ob2 are matched with each other until the first object gets out of the range within which it is regarded that the two objects are matched.

That is, in this illustrative embodiment, the release processing of two steps is required to cancel the setting of the limit function. By setting the cancel processing of two steps, it is possible to reduce the erroneous operations due to the unintentional release of the limit function. Also, the third to fifth objects ob3, ob4, ob5 may not be displayed on the display 31.

<Second Illustrative Embodiment>

In the below, a mobile phone 10A which is an example of a portable device according to a second illustrative embodiment of the present invention will be described with reference to the drawing. The mobile phone 10A has the same configuration as the mobile phone 10, except for the display content on the cancel screen. In this illustrative embodiment, a display screen shown in FIGS. 9A and 9B is displayed as the cancel screen.

Figure 9A:
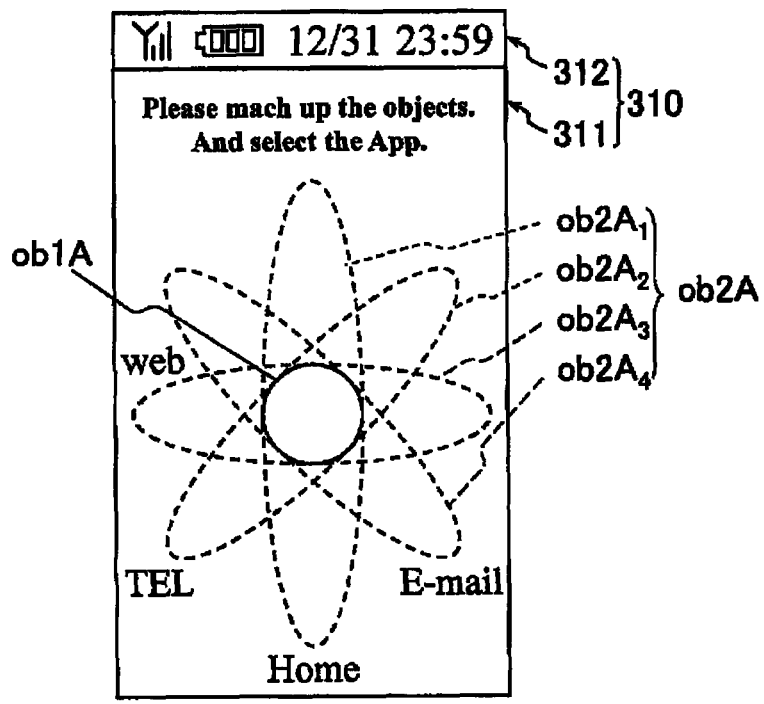
FIGS. 9A and 9B show a cancel screen of a mobile phone according to a second illustrative embodiment of the present invention.
Figure 9B:
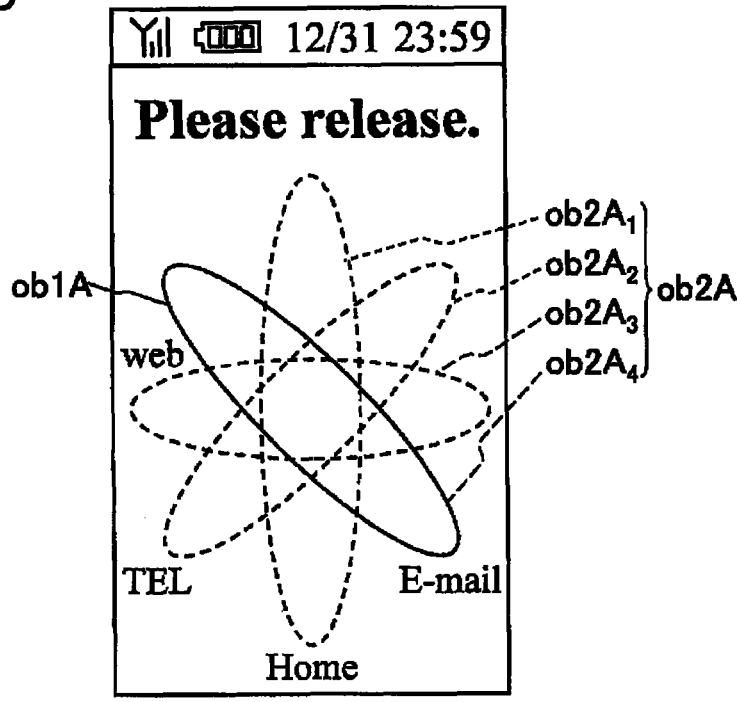

In the cancel screen shown in FIGS. 9A and 9B, a first circular object ob1A is displayed with the solid line and a second elliptical object ob2A is displayed with the dotted line. In this illustrative embodiment, four second objects are shown, each of which is indicated by the second object ob2A$_x$ (x: integer of 1 to 4). Meanwhile, in this illustrative embodiment, the number of the second objects ob2A is four. However, the present invention is not limited thereto and the number of the second objects can be arbitrarily set.

In the cancel screen, a size and a shape of the first object ob1A are changed to match with one of the second objects ob2A to perform the second cancel processing. The first object ob1A is enlarged into an elliptical shape about a center of the first object ob1A. A long radius (radius of a major axis) of the first object ob1A enlarged into an elliptical shape is a distance between the center and the coordinates at which the touch is being made, and a short radius (radius of a minor axis) keeps an original distance.

A flowchart of the cancel screen shown in FIGS. 9A and 9B is different from the flowchart shown in FIG. 6 in the fifth step S25 and the sixth step S26. In the flowchart of this illustrative embodiment, instead of the fifth step S25, it is determined whether the first object is matched with which of the second objects $ob2A_x$. In this illustrative embodiment, the screen, which is displayed in the sixth step S26 after the second cancel processing by the second object $ob2A_x$ for which it is determined in the fifth step S25 that it is matched with the first object, is different. For example, when it is determined that the first object is matched with the second object $ob2A_1$, the standby screen is displayed. Also, when it is determined that the first object is matched with one of the second objects $ob2A_2$ to $ob2A_4$, an application corresponding to the second objects $ob2A_2$ to $ob2A_4$ starts and a screen based on the application is displayed. In the example shown in FIGS. 9A and 9B, the second object $ob2A_2$ corresponds to a call application, the second object $ob2A_3$ corresponds to a WEB application and the second object $ob2A_4$ corresponds to an e-mail application. The applications corresponding to the second objects $ob2A_x$ are not limited thereto and can be arbitrarily selected.

<Third Illustrative Embodiment>

In the below, a mobile phone 10B which is an example of a portable device according to a third illustrative embodiment of the present invention will be described with reference to the drawings. The mobile phone 10B has the same configuration as the mobile phone 10, except for the display content on the cancel screen. In this illustrative embodiment, a display screen shown in FIGS. 10A and 10B is displayed as the cancel screen.

Figure 10A:
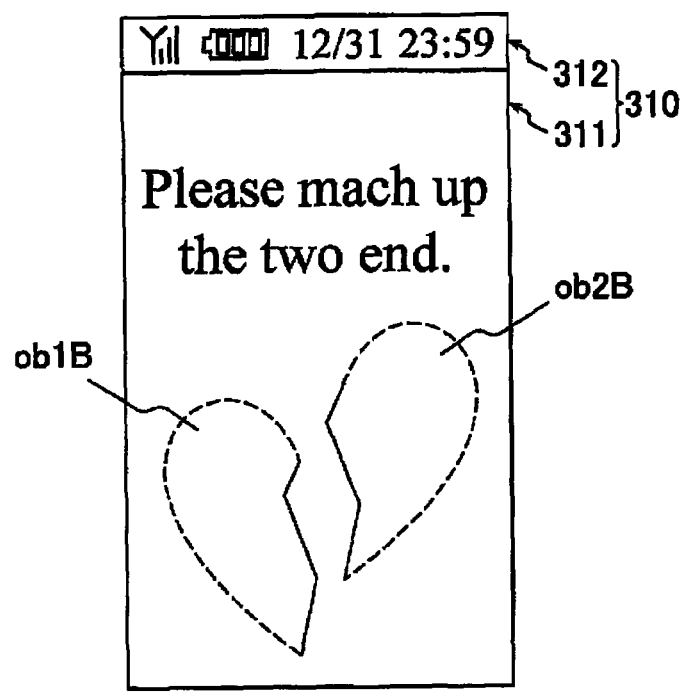
FIGS. 10A and 10B show a cancel screen of a mobile phone according to a third illustrative embodiment of the present invention.
Figure 10B:
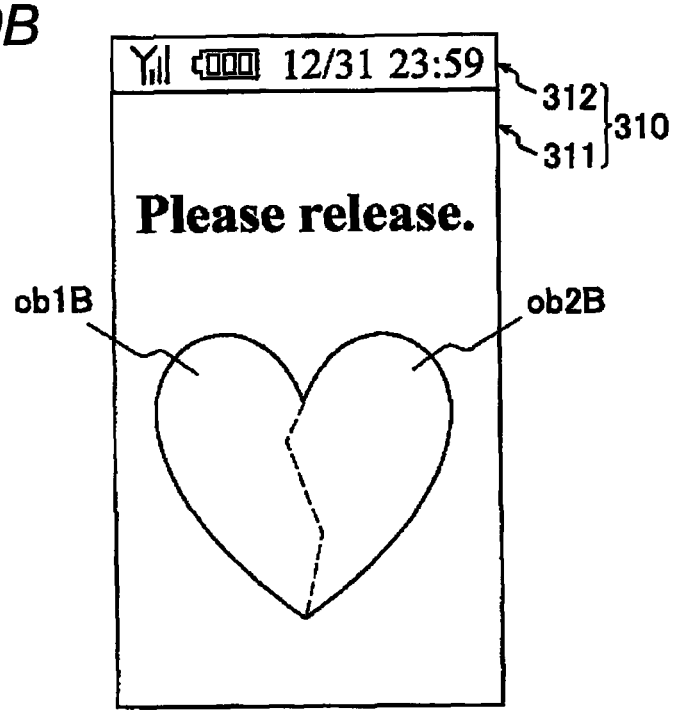

In the cancel screen shown in FIGS. 10A and 10B, a first object ob1B is configured by a left half of a heart and a second object ob2B is configured by a right half of the heart are displayed. In the cancel screen, the first object ob1A and the second object ob2A are combined to configure one heart to perform the second cancel processing.

Figure 11:
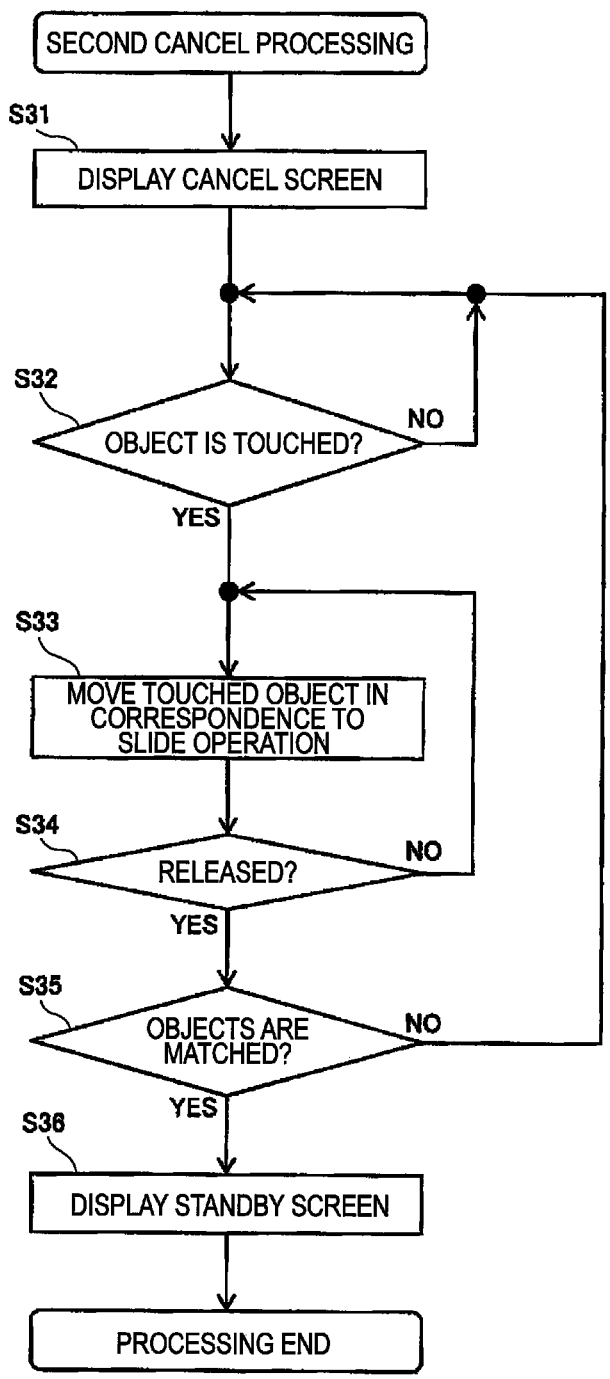
FIG. 11 is a flowchart showing an operation sequence of the cancel screen shown in FIG. 10.

The cancel screen shown in FIGS. 10A and 10B is canceled according to an operation method shown in a flowchart of FIG. 11. First, in a first step S31, the cancel screen is displayed. Then, in a second step S32, it is determined whether the first object ob1B and the second object ob2B are touched. When it is determined that at least one of the first object ob1B and the second object ob2B is touched, the process proceeds to a third step S33. When it is determined that the first object ob1B is not touched, the process returns to the second step S32. Then, in the third step S33, the control device 20 moves the first object ob1B in correspondence to a slide operation of the finger having touched on the first object ob1B and/or moves the second object ob2B in correspondence to a slide operation of the finger having touched on the second object ob2B. The moving of the touched first object ob1B and second object ob2B is repeated until it is determined in a fourth step S34 that the touch is released. In the fourth step S34, when it is determined that the touch is released, the process proceeds to a fifth step S35. In the fifth step S35, it is determined whether the first object ob1B and the second ob2B are combined upon the release operation. In this illustrative embodiment, it is determined whether the parts of the first object ob1B and the second ob2B, which are shown with the solid line, are matched with each other. In other words, it is determined whether the solid line part of the first object ob1B and the solid line part of the second object ob2B overlap each other. In the fifth step S35, when it is determined that the two objects ob1B, ob2B are matched, the process proceeds to a sixth step S36. Otherwise, the process returns to the second step S22. In the sixth step S36, as the second cancel processing, the standby screen is displayed, and then the processing of the second cancel processing is over. That is, since the second cancel processing is performed by the release operation with the two objects being matched with each other, it is possible to reduce the unintentional cancel of the limit function.

In the flowchart shown in FIG. 11, it is determined in the fourth step S34 and the fifth step S35 whether the objects are matched with each other upon the release operation. Here, in order to obtain the determination that the objects are matched, it is necessary to appropriately move at least one of the first object ob1B and the second object ob2B by a slide operation. When one object is touched, the control device 20 slides the touched object toward the other object. Also, when two objects ob1B, ob2B are touched, the control device 20 slides both touched objects such that they come close to each other. By the slide operation, it is possible to match the first object ob1B and the second object ob2B. Then, the touch is released with the first object ob1B and the second object ob2B being matched with each other, so that it can be determined in the fourth step S34 and the fifth step S35 that the two objects are matched.

Meanwhile, the second to fifth steps S32 to S35 of this illustrative embodiment are independently performed for each object. For example, when the second object ob2B is touched while the first object ob1B is being slid, both objects can be slid. Also, when the finger touching on one object is released while both objects are being touched, the determination of the fifth step S35 is performed. Here, when it is determined that the two objects ob1B, ob2B are matched with each other, the standby screen is displayed irrespective of the other operation, and then the second cancel processing is over.

Also, in the cancel screen, when the touch is released with the first object ob1B and the second object ob2B not being matched with each other, the second cancel processing is not performed and the screen is returned to the initial display of the cancel screen. It can be exemplified a case where the moving distance during the slide operation after the touch on the object is short and a case where the moving distance during the slide operation after the touch on the object is long. That is, the moving distance during the slide operation is set as the processing condition of the second cancel processing. By the processing condition of the second cancel processing, even when an unintentionally touched object is moved with being touched, it is possible to reduce that the cancel processing is unintentionally performed.

Also, in the display configuration shown in FIGS. 10A and 10B, when the first object ob1B and the second object ob2B are matched with each other, a message prompting a user to perform the release operation is displayed on the display 31. That is, it is indicated that the second cancel processing is performed by the release operation. Hence, it is possible to confirm that the cancel processing is performed in accordance with the user's intention. Also, when displaying a new message, instead of the message previously displayed, it may be possible to display the new message differently from the message previously displayed. For example, the letters configuring the message may be enlarged or may be displayed on and off or colors thereof may be changed so that the user can easily recognize the changed message. In the display configuration shown in FIGS. 10A and 10B, the letters configuring the message are enlarged and displayed.

Also, in the third step S33, the touched object is moved by the slide operation of the user. By the moving, it is possible to confirm that the touch operation for canceling the limit function is recognized.

In determining whether the first object ob1B and the second object ob2B are matched with each other in the fifth step S35, it may be regarded that the two objects ob1B, ob2B are matched when they are within a predetermined range. By setting a range within which it is regarded that the two objects ob1B, ob2B are matched, even though the size of the first object ob1B is changed upon the release operation, for example, it is possible to perform the second cancel processing by the user's intention. Also, since it is possible to easily match the two objects each other, it is possible to reduce the user's burden on the operation.

Figure 12:
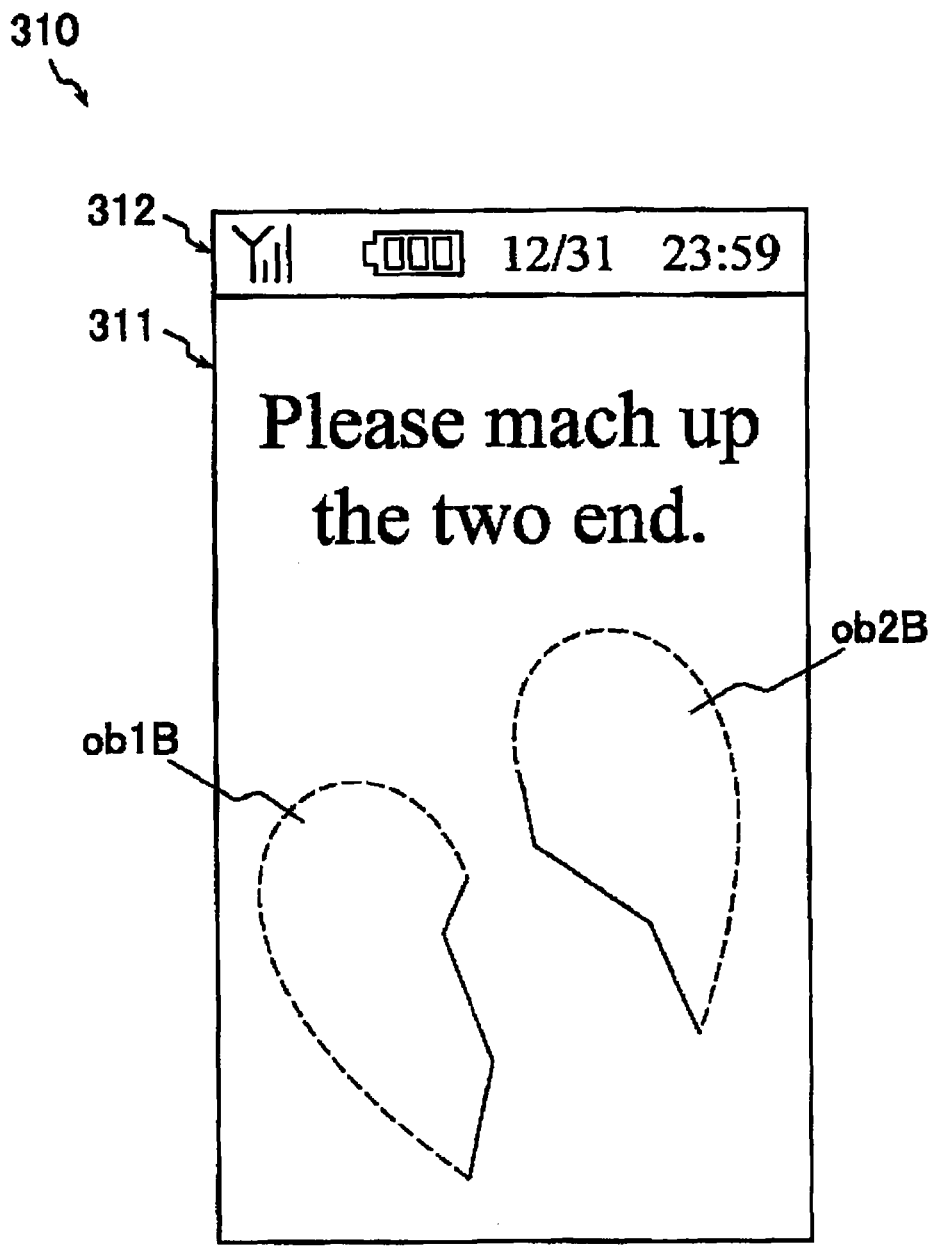
FIG. 12 shows a modified illustrative embodiment of the cancel screen shown in FIG. 10.

Also, in the cancel screen shown in FIGS. 10A and 10B, the objects are made to match with each other even by the parallel moving, without rotating the objects. However, as shown in FIG. 12, an initial arrangement where it is necessary to rotate the objects is also possible. The touch operation of rotating the objects may include following operations, for example. First, one object is touched by two fingers. Then, the two touching fingers are slid. At this time, a gradient of a virtual line connecting two coordinates touched by the two fingers is changed to rotate the object. By the operation, it is possible to rotate the object. As shown in FIG. 12, the user is asked to perform the touch operation of rotating the object. Hence, it is possible to reduce that the second cancel processing will unintentionally occur.

Also, in the cancel screen, the display position of at least one of the first object ob1B and the second object ob2B may be randomly changed.

<Fourth Illustrative Embodiment>

In the below, a mobile phone 10C which is an example of a portable device according to a fourth illustrative embodiment of the preset invention will be described with reference to the drawings. The mobile phone 10C has the same configuration as the mobile phone 10, except for the display content on the cancel screen. In this illustrative embodiment, a display screen shown in FIG. 13 is displayed as the cancel screen.

Figure 13A:
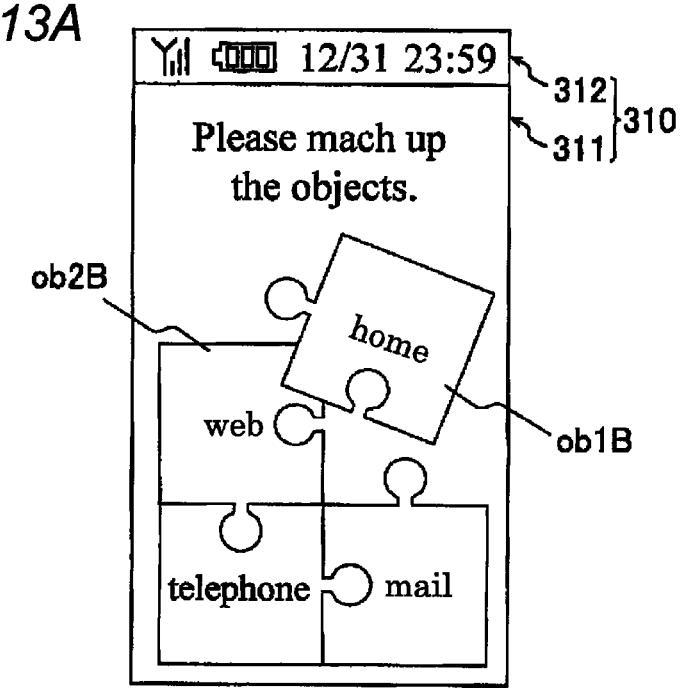
FIGS. 13A and 13B show a cancel screen of a mobile phone according to a fourth illustrative embodiment of the present invention.
Figure 13B:
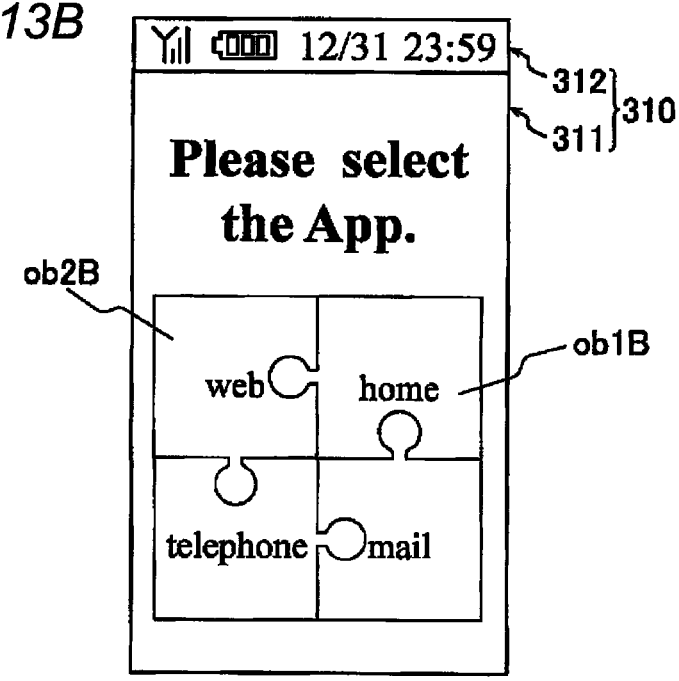

In the cancel screen shown in FIG. 13, a first object ob1C and a second object ob2C are displayed. The first object ob1C has one piece shape of a jigsaw puzzle. The second object ob2C is the other part of the jigsaw puzzle which is completed by fitting the first object ob1C. In the cancel screen, the first object ob1C is fitted with the second object ob2C, so that the jigsaw puzzle is completed and thus the second cancel processing is performed.

Figure 14:
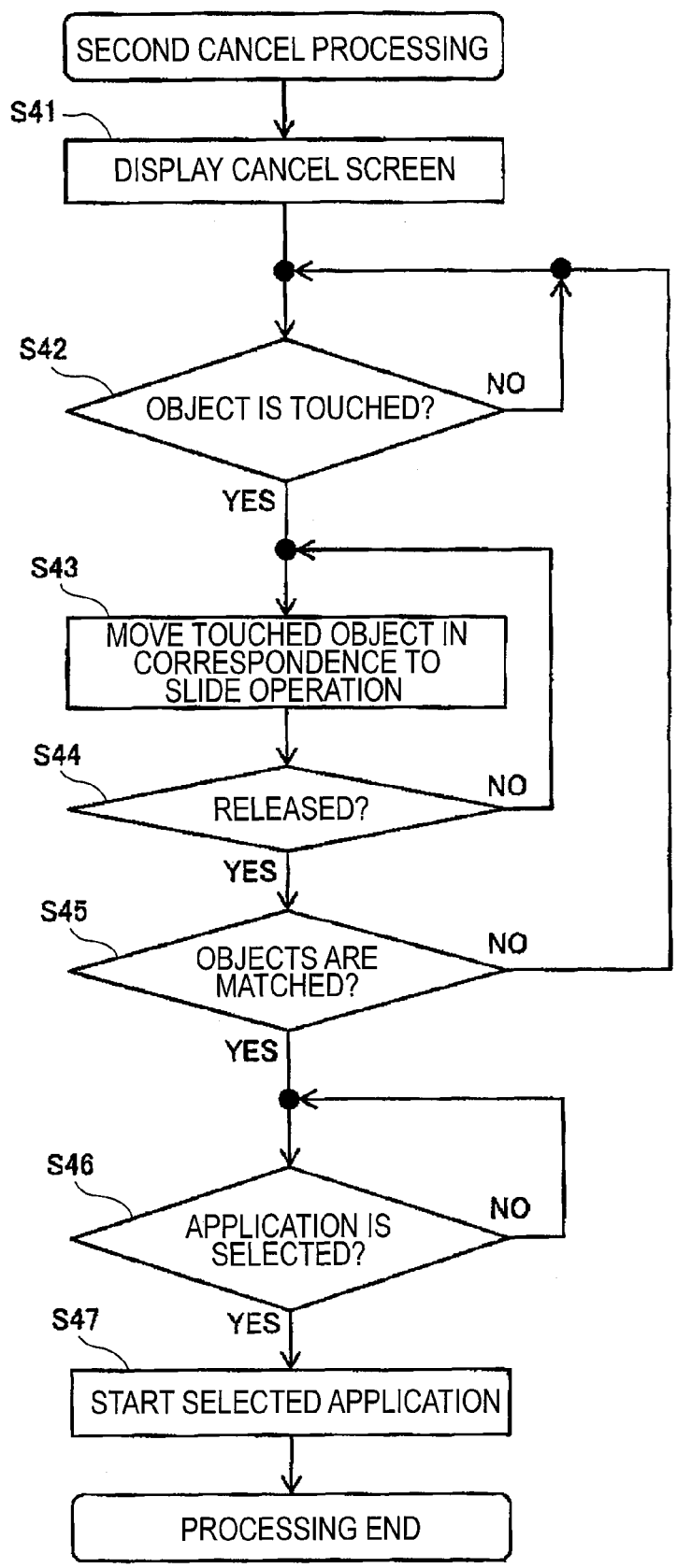
FIG. 14 is a flowchart showing an operation sequence of the cancel screen shown in FIG. 13.

The cancel screen shown in FIG. 13 is canceled by an operation method shown in a flowchart of FIG. 14. This flowchart is different from the flowchart of FIG. 11, in that a sixth step S46 and a seventh step S47 are provided, instead of the sixth step S36. The cancel screen is configured such that an application corresponding to each piece can be selected when it is determined that the first object ob1C and the second object ob2C are matched.

Also, in the display configuration shown in FIG. 13, when an application can be selected, a message prompting the user to select an application is displayed on the display 31. That is, it is indicated that the second cancel processing is performed by the release operation. Hence, it is possible to confirm that the cancel processing is performed by the user's intention. Also, when displaying a new message, instead of the message previously displayed, it may be possible to display the new message differently from the message previously displayed. For example, the letters configuring the message may be enlarged or may be displayed on and off or colors thereof may be changed so that the user can easily recognize the changed message. In the display configuration shown in FIG. 13, the letters configuring the message are enlarged and displayed.

In addition, in the display configuration shown in FIG. 13, application names displayed on the object ob1C and the object ob2C are differently displayed depending on whether an application can be selected. In this display configuration, when an application cannot be selected, an application name is faintly displayed, and when an application can be selected, an application name is thickly displayed. When an application cannot be selected, an application name is faintly displayed, so that it is possible to beforehand display an application which can be selected when the selection becomes possible. Also, when an application can be selected, an application name is thickly displayed, so that it is possible to easily notify the user that the application can be selected.

The present invention is not limited to the above illustrative embodiments. That is, various changes can be made without departing from the scope of the invention.

In the fourth illustrative embodiment, the screen different from the standby screen is displayed as the cancel screen. It may be also possible that a standby screen whose part is not displayed is adopted as the second object and the part of the standby screen, which is not displayed, is adopted as the first object.

Also, in a case where a call arrives while an application requesting a touch operation, such as game, is executed, when a selection screen for selecting a call response is immediately displayed, the touch operation which is input as an operation on the application may be erroneously recognized. In particular, when an operation such as receiving, holding and transmission is selected simply by a tap operation, a possibility of an erroneous input is increased. For example, the cancel screen shown in the second and fourth illustrative embodiments may be provided as a selection screen for selecting a call response.

The cancel method of the limit function shown in the first to fourth illustrative embodiments may be stored in a storage of a server for data transmission, as a cancel program, and may be transmitted to a mobile phone via the network. Also, various storage media in which the cancel program is stored may be sold or distributed. The various storage media may include an optical disk such as a CD, a DVD, a BD (Blue-ray Disk) and the like, a USB memory, a memory card and the like. When the release program, which is downloaded through the server or storage medium, is installed in a mobile phone having a configuration equivalent to the illustrative embodiments, the effects equivalent to the illustrative embodiments are obtained.

Also, the illustrative embodiments are not limited to the mobile phone 10 and can be applied to various portable devices such as smart phone, PDS (Personal Digital Assistant), PC and the like.

The specific numerical values enumerated in the specification are only exemplary and can be appropriately changed depending on the specifications of the products, if necessary.

In the specification, in the modified illustrative embodiments of the respective configurations, the capital alphabets of A to C are attached to the last of the reference numerals of the configurations before the modification.

What is claimed is:

1. A portable device comprising:
   a display unit;
   an input unit configured to detect an input to the display unit; and
   a control unit configured to set and cancel a limit function of limiting an input by the input unit, wherein the control unit is configured to:
      display three or more objects on the display unit including a first object and a plurality of second objects;
      change an outline of the first object based on an output from the input unit to create a changed first object, wherein both the first and at least one of the second objects are displayed before an output from the input unit to create the changed first object is received;

move and rotate at least the first object of the three or more objects based on an output from the input unit; and cancel the limit function when an outline of the changed first object and one of the second objects are overlaid and matched with each other by size and when sides of only two of the three or more objects, the sides of which configure a pair or have a same shape, are matched with each other as a result of moving and rotating at least the first object;

wherein the first object and a second object are initially displayed to overlap one another but are not matched.

2. The portable device according to claim 1, wherein the control unit is configured to display three or more objects on the display unit, to cancel the limit function when two of the displayed objects are matched with each other, and to execute a different application software in accordance with the matched objects.

3. The portable device according to claim 1, wherein the control unit is configured to display three or more objects on the display unit, to cancel the limit function when two of the displayed objects are matched with each other, and to display a different screen in accordance with the matched objects.

4. The portable device according to claim 1, wherein the control unit is configured to change sizes of the displayed objects based on an output from the input unit, and wherein the control unit is configured to cancel the limit function when the sizes of two of the objects are matched with each other.

5. The portable device according to claim 1, wherein the control unit is configured to move a displayed object based on an output from the input unit, and wherein the control unit is configured to cancel the limit function when sides of two of the objects, the sides of which configure a pair, are matched with each other.

6. The portable device according to claim 1, wherein the control wherein the control unit is configured to move a displayed object based on an output from the input unit, and wherein the control unit is configured to cancel the limit function when sides of two of the objects, the sides of which have a same shape, are matched with each other.

7. The portable device according to claim 1, wherein the control unit is configured to rotate a displayed object based on an output from the input unit, and wherein the control unit is configured to cancel the limit function when sides of two of the objects, the sides of which configure a pair, are matched with each other.

8. The portable device according to claim 1, wherein the control unit is configured to rotate a displayed object based on an output from the input unit, and wherein the control unit is configured to cancel the limit function when sides of two of the objects, the sides of which have a same shape, are matched with each other.

9. A portable device comprising:
a display unit;
an input unit configured to detect an input to the display unit; and
a control unit configured to set and cancel a limit function of limiting an input by the input unit, wherein the control unit is configured to display three or more objects on the display unit including a first object and a plurality of second objects, and to cause any of a plurality of applications to be selectable when two of the three or more displayed objects are matched with each other, and wherein when one of the applications is selected, the control unit is configured to:

change an outline of the first object based on an output from the input unit to create a changed first object, wherein both the first and at least one of the second objects are displayed before an output from the input unit to create the changed first object is received;

move and rotate at least the first object of the three or more objects based on an output from the input unit; and cancel the limit function when an outline of the changed first object and the second object are overlaid and matched with each other by size and when sides of only two of the three or more objects, the sides of which configure a pair or have a same shape, are matched with each other as a result of moving and rotating at least the first object;

wherein the first object and a second object are initially displayed to overlap one another but are not matched.

10. The portable device according to claim 9, wherein the control unit is configured to change sizes of the displayed objects based on an output from the input unit, and wherein the control unit is configured to cancel the limit function when the sizes of two of the objects are matched with each other.

11. The portable device according to claim 9, wherein the control unit is configured to move a displayed object based on an output from the input unit, and wherein the control unit is configured to cancel the limit function when sides of two of the objects, the sides of which configure a pair, are matched with each other.

12. The portable device according to claim 9, wherein the control unit is configured to rotate a displayed object based on an output from the input unit, and wherein the control unit is configured to cancel the limit function when sides of two of the objects, the sides of which configure a pair, are matched with each other.

13. A non-transitory computer-readable storage medium having a control program stored thereon and readable by a controller of a portable device which includes a display unit and an input unit configured to detect an input to the display unit, the program, when executed by the controller, causing the controller to perform operations comprising:

setting a limit function of limiting an input by the input unit;

displaying three or more objects on the display unit including a first object and a plurality of second objects;

changing an outline of the first object based on an output from the input unit to create a changed first object, wherein both the first and at least one of the second objects are displayed before an output from the input unit to create the changed first object is received;

moving and rotating at least the first object of the three or more objects based on an output from the input unit; and canceling the limit function when an outline of the changed first object and one of the second objects are overlaid and matched with each other by size and when sides of only two of the three or more objects, the sides of which configure a pair or have a same shape, are matched with each other as a result of moving and rotating at least the first object;

wherein the first object and a second object are initially displayed to overlap one another but are not matched.

14. A control method of a portable device which includes a display unit and an input unit configured to detect an input to the display unit, the method comprising:

setting a limit function of limiting an input by the input unit;

displaying three or more objects on the display unit including a first object and a plurality of second objects;

changing an outline of the first object based on an output from the input unit to create a changed first object, wherein both the first and at least one of the second objects are displayed before an output from the input unit to create the changed first object is received;

move and rotate at least the first object of the three or more objects based on an output from the input unit; and canceling the limit function when an outline of the changed first object and the second object are overlaid and matched with each other by size and when sides of only two of the three or more objects, the sides of which configure a pair or have a same shape, are matched with each other as a result of moving and rotating at least the first object;

wherein the first object and a second object are initially displayed to overlap one another but are not matched.

15. The portable device according to claim 1, wherein the control unit is configured to change the size of the first object based on an output from the input unit to create a resized first object; and cancel the limit function when the resized first object and the second object are overlaid and matched with each other by size.

16. The portable device according to claim 1, wherein the control unit is configured to cancel the limit function when the outline of the changed first object, which is caused by an output based on a single (continuous) touch input, and the second object are overlaid and matched with each other by size.

17. A portable device comprising:

a display unit;

an input unit configured to detect an input to the display unit; and a control unit configured to set and cancel a limit function of limiting an input by the input unit, wherein the control unit is configured to:

display three or more objects on the display unit including a first object and a plurality of second objects, each of the second objects having a predetermined shape and corresponding to an application, respectively;

change a shape of the first object based on an output from the input unit to create a changed first object, wherein both the first and at least one of the second objects are displayed before an output from the input unit to create the changed first object is received;

move and rotate at least the first object of the three or more objects based on an output from the input unit; and when the shape of the changed first object and a predetermined shape of one of the second objects are overlaid and matched with each other, cancel the limit function and execute an application corresponding to the one of the second objects and when sides of only two of the three or more objects, the sides of which configure a pair or have a same shape, are matched with each other as a result of moving and/or rotating at least the first object;

wherein the first object and a second object are initially displayed to overlap one another but are not matched.

18. The portable device according to claim 1, wherein the limit function is canceled when two objects among more than three objects being displayed are matched.

19. The portable device according to claim 1, wherein objects having different outlines are displayed for each application, and when an outline of a particular object is matched with one of other objects, the application corresponding to the matched object is activated.

* * * * *